United States Patent [19]
Johnson

[11] 3,959,519
[45] May 25, 1976

[54] FORTIFICATION OF FOOD MATERIALS WITH A METHIONINE SOURCE

[75] Inventor: Rayner Selby Johnson, Wilmington, Del.

[73] Assignee: E. I. Du Pont de Nemours and Company, Wilmington, Del.

[22] Filed: June 5, 1975

[21] Appl. No.: 584,121

Related U.S. Application Data

[63] Continuation-in-part of Ser. No. 251,656, May 9, 1972, abandoned.

[52] U.S. Cl. .......................... 426/648; 260/112.5 R; 426/623; 426/656
[51] Int. Cl.² .......................... A23K 1/16; A23L 1/30
[58] Field of Search ................ 426/648, 656, 623; 260/112.5

[56] References Cited
UNITED STATES PATENTS

| | | | |
|---|---|---|---|
| 2,835,590 | 5/1958 | Rusoff................................. | 426/533 |
| 3,256,095 | 6/1966 | Crosby et al........................... | 426/2 |
| 3,415,655 | 12/1968 | Hino et al. ...................... | 426/656 X |
| 3,701,666 | 10/1972 | Winitz............................. | 426/648 X |

*Primary Examiner*—James R. Hoffman

[57] ABSTRACT

Various foods and feeds can be fortified by incorporation therein of a methionine source selected from glycyl-D,L-methionine, glycyl-L-methionine, D,L-methionylglycine, and L-methionylglycine. These methionine sources are stable to storage under normal conditions, yet can be broken down in animal organisms to utilizable methionine.

6 Claims, No Drawings

FORTIFICATION OF FOOD MATERIALS WITH A METHIONINE SOURCE

This application is a continuation-in-part of my co-pending application Ser. No. 251,656, filed May 9, 1972, and now abandoned.

BACKGROUND OF THE INVENTION

This invention relates to a novel method of fortifying foods or animal feeds with a source of methionine.

Certain amino acids are indispensable components of the diet of higher animals and are called essential amino acids. It has been shown that for maintenance of nitrogen balance, a certain fixed level of the essential amino acids must be supplied in the diet. If just one of these amino acids is not at the required level, then the animal fails to grow at an optimum rate, regardless of the fact that the other essential amino acids are in adequate or in more than adequate supply. The acid in short supply is termed "limiting".

This problem has been encountered, for example, in the poultry industry, where rations are designed for optimum performance at least cost. In the typical corn-soybean meal rations, methionine is the first limiting amino acid because the content of this amino acid tends to be lower in terms of the concentration of the other essential amino acids. While methionine is an essential amino acid, it must be obtained from outside sources because it cannot be synthesized in the organism of a higher animal.

Commercial livestock feeds are mainly mixtures of various grains, grain and mill by-products, oil meals, roughages, etc., very little animal protein being used. Because of this fact, the rations tend to be marginal or limiting in terms of methionine for optimum growth performance, since the methionine content of plant protein is relatively low. Supplementation of poultry foods with low levels of methionine results in marked increases of meat production and feed efficiency. Supplementation of feeds for poultry, pigs, sheep, beef and dairy animals should result in improved meat and milk production.

Likewise, methionine can be limiting in human diets in areas of the world where the dietary protein is mainly of vegetable origin. In such areas, supplementation of the human diet with methionine or an acceptable methionine source would improve the nutritional status of local populations.

Methionine suffers from a serious shortcoming in that it develops on standing an unpleasant odor, which can adversely affect the palatability of foods or feeds fortified therewith. An ideal fortifying agent would be an odor-free methionine source from which methionine could be readily recovered in the animal or human organism.

SUMMARY OF THE INVENTION

According to this invention, it has now been discovered that various foods or feeds (hereinafter, food materials) can be fortified with one or more methionine sources selected from glycyl-D,L-methionine, glycyl-L-methionine, D,L-methionylglycine, and L-methionylglycine. Such fortified food materials are stable under normal processing and storage conditions without development of bad odor. The absence of unpleasant odor development reflects the stability of the fortified food materials.

DETAILED DESCRIPTION OF THE INVENTION

D,L-methionine fortification has been considered in the past for such food materials as, for example, soy milk, soya flours, corn-soya flours, oatmeal, potatoes, alfalfa leaf meal, corn meal, peanut flour, all legumes, rice-bean mixtures, cassavi-gravi and ground nut flower; see, for example, "Amino Acid fortification of Protein Foods", edited by Scrimshaw, N. S. and Altschul, A. M., MIT Press (1971). The science of fortification of foods with amino acids is young and, as it develops, undoubtedly other food materials will be found to benefit by the addition of amino acids.

Concentrations of methionine sources to be added to fortify foods will vary with each food material, since the deficiencies or imbalance of amino acids are different in each food material. Also, the optimum balance of amino acids will certainly be more precisely defined in the future than at present. The balance of different food material, for example, cereals, meats, milk products, vegetables, etc., will affect the preferred concentrations of methionine for food supplementation. Consequently, it is possible only to illustrate typical concentrations rather than to specify preferred limits. In the above-cited MIT publication, corn-soya flour was reported to have been fortified for tests with 0.2% methionine, sunflower meal with 0.2% methionine, cottonseed flour with 0.23% methionine, and soybean flour with 0.23% methionine.

There are many ways to incorporate a methionine source into food materials. The exact method is not critical as regards this invention, but low odor will be important in any of them. The following illustrate some methods, but other methods can be easily devised:

The methionine source can be blended with flours, meals and grains at flour mills, bakeries, etc. It is necessary that it be distributed uniformly and in the correct concentration throughout the flours. Particle size of the methionine source can be modified by grinding to provide optimum particle size for dispersion in the flour mixes.

The methionine source can be compressed into tablets with other additives and natural food ingredients so that, for example, one tablet or wafer can be added per 100 lb. of flour at the bakery in bread-making operatings.

The methionine source can be formed into granules, with other additves and natural diluents, in shapes resembling natural rice grains, then mixed with rice.

The methionine source can be mixed with flour and liquid into a paste form and extruded into the center of strands of pasta (such as noodles, spaghetti, and the like).

Meal and grains can be coated by processes known in the art with materials of low water solubility in which the methionine source is dispersed. For example, these can be applied in solvents, followed by solvent evaporation; or they can be applied as molten material at elevated temperature, then solidified by cooling.

The methionine source need not be added to the particular food which is deficient in these amino acids. The diet may be supplemented by adding the amino acid to other foods which are normally eaten in the diets of the same people who use amino acid deficient foods. For example, these methods can be used:

The methionine source can be mixed with curry powder which is used to flavor rice, wheat, corn and other products.

The methionine source can be mixed with salt.

The methionine source can be compressed into cubes or tablets, like bouillon cubes, which are then used in hot water or by mixing with other foods.

Glycyl-D,L-methionine, glycyl-L-methionine, D,L-methionylglycine, and L-methyionylglycine are well known, readily available chemicals, which can be obtained, for example, from Mann Research Laboratories, Division of Beckton-Dickinson and Co., 136 Liberty Street, New York, New York 10006. L-Methionylglycine has a specific optical rotaion of +86.5±0.5°, and glycyl-L-methionine has a specific optical rotation of −10.0°, each in water solution at a concentraion of 2 g. per 100 g. of water.

In order to break down any of the above methionine sources and recover free methionine, the animal organism must possess a suitable enzyme. The utilization of methionine-containing peptide can be shown, for example, in animal feeding tests. However, the formation of free methionine can also be shown directly in tests with a microorganism requiring methionine for its growth and reproduction. The following Example describes a quantitative test involving a known bacterial mutant.

EXAMPLE 1

*Leuconostoc mesenteroides* P-60 was the bacterial mutant used to assess the biological availability of L-methionine in glycyl-D,L-methionine, glycyl-L-methionine and L-methionylglycine. This mutant is unable to synthesize methionine and therefore requires an external source of this amino acid.

Under aseptic conditions, a substrate devoid of L-methionine was supplemented with graded amounts of glycyl-D,L-methionine, glycyl-L-methionine, and L-methionylglycine and then inoculated with a drop of a washed *L. mesenteroides* P-60 culture. After 17 hours of incubation at 37°C., the growth of *L. mesenteroides* P-60 in each of the culture tubes was measured turbidimetrically, at a wavelength of 650 $\mu$. Based on the growth response of this mutant to a similar treatment with a standard L-methionine solution of known concentration, the L-methionine response, if any, to the candidate peptides was evaluated. The results in the table below demonstrate that L. mesenteroides P-60 can utilize glycyl-D,L-methione, glycyl-L-methionine and L-methionylglycine as a source of L-methionine.

TABLE 1

Bioavailability of L-Methionine in Methionine Dipeptides

| Dipeptide | Level Tested $\mu$g./ tube | Calculated L-Methionine Equivalence, $\mu$g. | L-Methionine Response $\mu$g. | % of Theoretical |
|---|---|---|---|---|
| Glycyl-D,L-Methionine | 12 | 4.0 | 3.5 | 88 |
| | 24 | 8.0 | 7.5 | 94 |
| Glycyl-L-Methionine | 6 | 4.0 | 4.5 | 112 |
| | 12 | 8.0 | 7.8 | 97 |
| L-Methionyl-glycine | 6 | 4.0 | 4.0 | 100 |
| | 12 | 8.0 | 7.5 | 94 |

The above data are indicative that *L. mesenteroides* P-60, as is the case with many microorganisms, possesses extracellular and/or intracellular enzymes capable of hydrolyzing peptides (peptidases), to yield amino acids necessary for the growth of the microorganisms. Livestock, both ruminant and monogastric animals, as well as humans are also dependent on nitrogen-containing food (protein) for growth and maintenance. Ingested protein, before it can be of any utility to the tissue cells, must be degraded (hydrolyzed) to the amino acid state. In general, the family of enzymes including the various peptidases responsible for thin protein hydrolysis reside in the gastrointestinal tract. Therefore, in view of the fact that microorganisms and the higher forms of animal life possess similar proteolytic enzymes, it is to be expected that the L-methionine in the above three methionine sources should be of high biological availability to the higher forms of life.

A representative animal feeding experiment is described in the following Example 2.

EXAMPLE 2

Procedure

For this test, cockerels are produced from a cross of Barred Rock males and Rhode Island females. All the 150 cockerels are selected on the basis that their weight differs no more than 2 grams. The birds are maintained on an all vegetable protein corn-soy basal diet for a 2-week preliminary period. At the end of this period, a median group of 90 birds is selected on the basis of weight, and they are then evenly distributed into three experimental groups, which in turn are placed on the experimental rations (Table 2). The level of glycyl-D,L-methionine in Diet No. 3 is equivalent to the level of D,L-methionine in Diet No. 2, on the basis of L-methionine content. The birds are weighed weekly and their feed consumption also determined weekly, to permit weekly feed efficiency evaluations.

TABLE 2

| Experimental Rations | (Control) Ration 1 lbs. | Ration 2 lbs. | Ration 3 lbs. |
|---|---|---|---|
| Ground corn | 37 | 37 | 37 |
| Soybean mean | 29 | 29 | 29 |
| Wheat bran | 15 | 15 | 15 |
| Wheat middlings | 10 | 10 | 10 |
| Alfalfa leaf meal | 5 | 5 | 5 |
| Bone meal | 1.5 | 1.5 | 1.5 |
| Calcium carbonate | 1.0 | 1.0 | 1.0 |
| Iodized salt | 0.5 | 0.5 | 0.5 |
| Riboflavin supplement (550 mc/g.) | 0.3 | 0.3 | 0.3 |
| Vitamin A&D oil | 0.5 | 0.5 | 0.5 |
| MnSO$_4$·4H$_2$O | 7.85 g. | 7.85 g. | 7.85 g. |
| D,L-Methionine | — | 68 g. | — |
| Glycyl-D,L-methionine | — | — | 92 g. |
| % Crude protein | 21.70 | 21.62 | 21.65 |

After 4 weeks, the average weight of the chicks in the group on Control Ration 1 increases from 37 grams to 272 grams. The average weights of chicks receiving Rations 2 and 3 are about 11% greater than those of the control group. After 8 weeks, the chicks on Ration 1 average 837 grams in weight. The average weight of chicks receiving Rations 2 and 3 for 8 weeks is about 14% greater than of those on Ration 1. Feed efficiencies in terms of grams of feed/gram of body weight gain after 8 weeks are 2.75 for Rations 2 and 3 and 3.22 for the unfortified Ration 1.

It is apparent from these results that supplementation of a practical corn-soy poultry ration with 0.15% D,L-methionine or with 0.2% glycyl-D,L-methionine produces significant growth increases and improved feed efficiencies. No significant difference is noted between the responses resulting from the methionine and glycyl-methionine supplemented rations, indicating nutritional equivalence of the amino acid and its dipeptide.

EXAMPLE 3

Samples of virtually odorless, recrystallized D,L-methionine, glycyl-D,L-methionine, and D,L-alanyl-D,L-methionine were stored in sealed containers for twenty-nine days at 45°C. The sample of glycyl-D,L-methionine was still virtually odor-free, while the other two samples developed a typical sulfurous odor.

This example shows that glycyl-D,L-methionine, one of the methionine sources of the present invention, is superior not only to methionine itself but also to another simple methionine dipeptide.

It will be readily understood that the above three examples merely illustrate certain aspects of this invention but should not be construed to limit the invention in any manner. Other embodiments of this invention are possible and will be readily apparent to one skilled in the art.

I claim:

1. A method of producing a stable fortified food material comprising incorporation into the food material a fortifiably effective amount of a methionine source selected from at least one of glycyl-D,L-methionine, glycyl-L-methionine, D,L-methionylglycine, and L-methionylglycine.

2. The method of claim 1 wherein the methionine source is glycyl-D,L-methionine.

3. The method of claim 1 wherein the methionine source is glycyl-L-methionine.

4. A stable fortified food material having incorporated therein a methionine source selected from at least one of glycyl-D,L-methionine, glycyl-L-methionine, D,L-methionyl-glycine, and L-methionylglycine.

5. The food material of claim 4, wherein the methionine source is glycyl-D,L-methionine.

6. The food material of claim 4, wherein the methionine source is glycyl-L-methionine.

* * * * *

UNITED STATES PATENT OFFICE
CERTIFICATE OF CORRECTION

Patent No. 3,959,519　　　　　　　　　Dated May 25, 1976

Inventor(s) Rayner Selby Johnson

It is certified that error appears in the above-identified patent and that said Letters Patent are hereby corrected as shown below:

The term of this patent subsquent to August 25, 1991, has been disclaimed.

Signed and Sealed this

Twenty-eighth Day of September 1976

[SEAL]

Attest:

RUTH C. MASON
*Attesting Officer*

C. MARSHALL DANN
*Commissioner of Patents and Trademarks*